United States Patent
Lo et al.

(10) Patent No.: US 6,667,983 B1
(45) Date of Patent: *Dec. 23, 2003

(54) SCALEABLE PRIORITY ARBITER FOR ARBITRATING BETWEEN MULTIPLE FIFO ENTRY POINTS OF A NETWORK INTERFACE CARD

(75) Inventors: Burton B. Lo, San Francisco, CA (US); Krishna Uppunda, Santa Clara, CA (US); Anthony L. Pan, Fremont, CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/321,068

(22) Filed: May 27, 1999

(51) Int. Cl.[7] .......................... H04L 12/28; H04L 12/56
(52) U.S. Cl. ....................................... 370/412; 370/428
(58) Field of Search ................................. 370/412, 413, 370/428, 395.1, 229, 465, 250, 231, 232

(56) References Cited

U.S. PATENT DOCUMENTS

| | | | | |
|---|---|---|---|---|
| 5,872,822 A | * | 2/1999 | Bennett | 375/372 |
| 5,944,779 A | * | 8/1999 | Blum | 709/201 |
| 6,052,375 A | * | 4/2000 | Bass | 370/412 |
| 6,356,962 B1 | * | 3/2002 | Kasper | 710/29 |
| 6,360,278 B1 | * | 3/2002 | Lo | 709/250 |
| 6,424,658 B1 | * | 7/2002 | Mathur | 370/429 |
| 6,442,168 B1 | * | 8/2002 | Vasa | 370/401 |

* cited by examiner

Primary Examiner—Ajit Patel
Assistant Examiner—Chirag Shah
(74) Attorney, Agent, or Firm—Wagner, Murabito & Hao LLP

(57) ABSTRACT

A scaleable priority arbiter for arbitrating between multiple FIFO entry points of a network interface card (NIC). The circuit provides a separate FIFO entry point circuit within the NIC for each data packet priority type. Exemplary priority types, from highest to lowest, include isochronous, priority 1, priority 2, . . . , priority n. A separate set of FIFO entry points are provided for NIC transmitting (Tx) and for NIC receiving (Rx). For each of the Tx FIFO entry points, a single Tx entry point register is seen by the processor and multiple downlist pointers are also maintained. The Tx entry point registers all feed a scaleable priority arbiter which selects the next message for transmission. The scaleable priority arbiter is made of scaleable circuit units that contain a sequential element controlling a multiplexer. The multiplexer selects between two inputs, a first input is dedicated to data packets of the priority type corresponding to the circuit stage and the other input comes from the lower priority chain. In one embodiment, timers regulate the transmission of isochronous packets. The arbiter transmits the isochronous packet, if any, with the timer and otherwise allows the next stage a transmit turn. The next stage checks if a priority 1 packet is present and if a priority 1 packet was not sent the last time its turn was reached. If yes, the priority 1 packet is sent, if not, then the above decision is repeated with respect to the next lower priority circuit stage. Priority arbitration improves quality of service performance.

18 Claims, 13 Drawing Sheets

60

```
ENTER
  ↓
┌─────────────────────────────────────────────┐
│ CONSTRUCT NEW PACKET IN VACANT MEMORY SPACE │──62
└─────────────────────────────────────────────┘
  ↓
┌─────────────────────────────────────────────┐
│ REQUEST ACCESS TO PCI BUS; AFTER OBTAINING PCI │──64
│        ACCESS, STALL THE NIC                │
└─────────────────────────────────────────────┘
  ↓
┌─────────────────────────────────────────────┐
│ REQUEST ACCESS TO PCI BUS; AFTER OBTAINING PCI │──66
│ ACCESS, SORT THROUGH LINKED LIST IN MEMORY TO │
│ APPEND NEW PACKET TO END OF LINKED LIST     │
│         (NIC REMAINS STALLED)               │
└─────────────────────────────────────────────┘
  ↓
┌─────────────────────────────────────────────┐
│ REQUEST ACCESS TO PCI BUS; AFTER OBTAINING PCI │──68
│ ACCESS, SIGNAL THE NIC TO RESUME PROCESSING │
│              PACKETS                        │
└─────────────────────────────────────────────┘
  ↓
RETURN
```

FIGURE 1B
PRIOR ART

SCALEABLE PRIORITY ARBITER FOR ARBITRATING BETWEEN MULTIPLE FIFO ENTRY POINTS OF A NETWORK INTERFACE CARD

BACKGROUND OF THE INVENTION

1. Field of the Invention

The present invention relates to the field of communication systems including communication among computer systems that are networked together. More specifically, the present invention relates to computer controlled communication systems having improved message queuing mechanisms for use with a network interface card (NIC).

2. Related Art

Networked communication systems ("networks") are very popular mechanisms for allowing multiple computers and peripheral systems to communicate with each other within larger computer systems. Local area networks (LANs) are one type of networked communication system and one type of LAN utilizes the Ethernet communication standard (IEEE 802.3). One Ethernet LAN standard is the 10 BaseT system which communicates at a rate of 10 Megabits per second and another Ethernet LAN standard, 100 BaseT, communicates at a rate of 100 Megabits per second. Computer systems can also communicate with coupled peripherals using different bus standards including the Peripheral Component Interconnect (PCI) bus standard and the Industry Standard Architecture (ISA) and Extended Industry Standard Architecture (EISA) bus standards. The IEEE 1394 serial communication standard is also another popular bus standard adopted by manufacturers of computer systems and peripheral components for its high speed and interconnection flexibilities.

FIG. 1A illustrates a prior art computer system 10 that can communicate data packets (messages) to and from a network of computers and peripherals 20 (a "network"). System 10 contains a processor 30 interfaced with a peripheral components interconnect (PCI) bus 25 which is also interfaced with a NIC device 12 and a volatile memory unit 40. The NIC 12 provides communication with the network 20. The NIC 12 provides a single register, called the Tx entry point 14, for queuing up data packets for transmission onto the network 20. The Tx entry point 14 contains a pointer to a linked list of data packets 45a–45n that reside in the volatile memory unit 40. Each data packet in the linked list contains a pointer 42a–42c to the next data packet for transmission. The NIC 12 reads the data packets of the linked list, in order, from the memory unit 40 and transmits then to network 20. When all the data packets in the linked list have been transmitted, or when the network 20 is down, the NIC 12 stops processing the data that is indicated by the pointer of the Tx entry point 14.

FIG. 1B illustrates a flow diagram 60 of steps performed by the processor 30 of system 10 (FIG. 1A) for queuing up a new data packet to NIC 12 for transmission over network 20. This flow diagram 60 illustrates the latencies attributed to system 10 for queuing up a new data packet. These latencies decrease the overall throughput of PCI bus 25 and degrade the performance of NIC 12 thereby decreasing the quality of service of system 10. At step 62 of FIG. 1 B, to queue up a data packet for transmission, the processor 30 constructs the new data packet in a vacant memory space of memory unit 40. At step 64, the processor 30 requests access to the PCI bus 25, waits its turn in the round-robin arbitration scheme for the access grant, and then commands the NIC 12 to stall its current activity. Each of these activities of step 64 introduces unwanted latencies. At step 66, while the NIC 12 remains stalled, the processor 30 again requests PCI bus access, waits for the grant, and then sorts through the linked list of data packets 45a–45n to determine the last data packet in the list. The new data packet is then appended (e.g., linked) to the last data packet, 45n. Each of these activities of step 66 introduces more unwanted latencies. Lastly, at step 68, while the NIC remains stalled, the processor 30 again requests PCI bus access, waits for the grant, and then signals the NIC 12 to resume its activities. Again, each of these activities of step 68 introduces unwanted latencies.

As shown above, the process 60 of queuing the new data packet for transmission requires at least 3 PCI bus requests which introduce unwanted latency because each request is followed by a waiting period for the bus grant and to make matters worse, the first PCI bus request stalls the NIC 12. The NIC 12 is stalled because it operates independently from the processor 30, sending and receiving information based on the data's availability and the network's throughput. In other words, at the time the processor 30 wants to append the new data packet to the linked list, the processor 30 does not know which data packet in the linked list that the NIC 12 is processing. Assuming the NIC is not stalled, if the processor 30 appends the new data packet to the linked list just after the NIC 12 processed the last part of the last data packet 45n, then the newly appended data packet would never be recognized by the NIC 12 and thereby would never be transmitted to network 20. This is called a "race" condition because the processor 30 and the NIC 12 are not synchronized and the processor 30 does not know the transmission status of the NIC 12 at all times. Therefore, to eliminate the race condition, the processor 30 stalls the NIC 12, appends the new data packet to the linked list, and then allows the NIC 12 to resume its activities as shown in FIG. 1B.

Unfortunately, requesting PCI bus access and NIC stalling, in accordance with the steps 60 of FIG. 1B, heavily degrade system performance. Each PCI bus request generated by the processor 30 interrupts and degrades the communication of other components on the PCI bus 25. Furthermore, while the processor 30 waits for PCI bus access in order to link the new packet to the linked list, the NIC 12 remains stalled, again degrading communication performance.

Moreover, in many new processing environments and architectures, communication systems and computer systems need to process and communicate data packets of different data types. For instance, electronic mail (email) messages are sent and received by the system 10 (FIG. 1A). Also, voice and image data are sent and received by the system 10 as well as other multi-media content. However, live broadcasts (e.g., voice and data) need high priority transmission without jitter to allow natural conversation and appearance, while other information, such as email messages, can be communicated successfully at lower priorities. Unfortunately, system 10 does not provide any special communication techniques for messages of different priorities.

Accordingly, what is needed is a communication system that reduces the latencies described above for queuing a new data packet for transmission by a NIC. What is needed further is a communication system that provides mechanisms for handling messages (data packets) having different priorities. The present invention provides these advantageous features. These and other advantages of the present invention not specifically mentioned above will become clear within discussions of the present invention presented herein.

SUMMARY OF THE INVENTION

A scaleable priority arbiter is described herein for arbitrating between multiple first-in-first-out (FIFO) entry points of a network interface card (NIC). The circuit provides a separate FIFO entry point circuit within the NIC for each data packet priority type. Exemplary priority types, from highest to lowest, include isochronous, priority 1, priority 2, ..., priority n. A separate set of FIFO entry points are provided for NIC transmitting (Tx) and for NIC receiving (Rx). For each of the Tx FIFO entry points, a single Tx entry point register is seen by the processor and multiple downlist pointers are also maintained. The Tx entry point registers all feed a scaleable priority arbiter which selects the next message for transmission. The scaleable priority arbiter is made of scaleable circuit units that contain a sequential element controlling a multiplexer. The multiplexer selects between two inputs, a first input is dedicated to data packets of the priority type corresponding to the circuit stage and the other input comes from the lower priority chain. In one embodiment, timers regulate the transmission of isochronous packets. The arbiter transmits the isochronous packet, if any, with the timer and otherwise allows the next stage a transmit turn. The next stage checks if a priority 1 packet is present and if a priority 1 packet was not sent the last time its turn was reached. If yes, the priority 1 packet is sent, if not, then the above decision is repeated with respect to the next lower priority circuit stage. Priority arbitration improves quality of service performance.

The FIFO entry points used in the scaleable priority arbiter are also described herein. The novel circuit of the present invention provides a FIFO implementation of a entry point of a network interface card (NIC). The FIFO implementation allows multiple downlist pointers to be maintained within the NIC for the transmit (Tx) FIFO entry point circuit and also allows multiple uplist pointers to be maintained for the receive (Rx) FIFO entry point circuit. For the Tx FIFO entry point circuit, only one register is visible to the processor which can load a memory pointer into the entry point register thereby placing the memory pointer on the bottom on the FIFO. Only one register is seen for the Rx FIFO entry point circuit. With respect to the Tx FIFO entry point, the NIC takes the oldest entry, obtains the packet from memory that is indicated by the corresponding pointer and transmits the packet onto a network. If the packet points to a next packet, then that next packet is sent, otherwise the next-in-line pointer of the Tx FIFO entry point is then processed by the NIC. Signals indicate when the Rx or Tx FIFO entry point circuits are full. An analogous process operates for the Rx FIFO entry point. Providing a queued entry point reduces processor utilization and peripheral component interconnect (PCI) bus utilization in communicating packets with the network because memory pointers can be directly pushed onto the transmit FIFO by the processor without encountering race conditions. Therefore, providing a queued entry point increases NIC efficiency because the NIC does not require stalling and unstalling to queue a data packet. Moreover, the processor can directly load the new pointer into the FIFO entry point circuit and does not need to search through a linked list to append the new data packet to its end. Both act to improve quality of service performance and reduce host processor utilization.

Specifically, an embodiment of the present invention includes a network interface card comprising: a transmit FIFO memory circuit for storing digital data to be transmitted from the network interface card onto a network; a scaleable priority arbiter circuit having N coupled stages and for selecting a select data packet for transmission from a group of data packets having N different transmission priorities, each stage of the scaleable priority arbiter circuit controlling the transmission of data packets of a same transmission priority and wherein the scaleable priority arbiter circuit transmits data packets of a highest transmission priority based on a fixed time interval; and a control circuit for accessing digital data representing the select data packet and for supplying the digital data to the transmit FIFO memory circuit.

Embodiments include the above and wherein each respective stage of the scaleable priority arbiter circuit comprises: a sequential circuit clocked by a transmit pulse and generating a select signal; and a multiplexer controlled by the select signal and having an output coupled to an input of an upstream stage of the scaleable priority arbiter circuit and having a first input representing a data packet of a transmission priority corresponding to the respective stage and a second input coupled to an output of a downstream stage of the scaleable priority arbiter circuit and wherein further each respective stage of the scaleable priority arbiter circuit, on its transmission turn, transmits a data packet of a transmission priority corresponding to the respective stage provided it has a data packet to transmit and, provided further, it did not transmit a data packet on its last transmission turn.

Embodiments also include a network adapter card for coupling with a computer system having a processor and a memory unit, the network adapter card comprising: a plurality of queued transmit entry point circuits, each for queuing data packets of a respective transmission priority and each comprising: a transmit entry point register; and a plurality of memory cells configured as a first-in-first-out (FIFO) memory circuit, the transmit entry point register for receiving, from the processor, new data packet pointers to data packets of the respective transmission priority and also for queuing the new data packet pointers into the FIFO memory circuit, the transmit entry point register also for maintaining the oldest queued data packet pointer of the FIFO memory circuit; a transmit FIFO memory circuit for storing digital data to be transmitted onto a network; and a control circuit for accessing digital data from a memory space of the memory unit of the computer system and for supplying the digital data to the transmit FIFO memory circuit, the memory space being identified by an oldest queued data packet pointer as maintained by a selected one of the plurality of queued transmit entry point circuits.

BRIEF DESCRIPTION OF THE DRAWINGS

FIG. 1B is a flow diagram of steps performed by the prior art communication system of FIG. 1A for queuing a data packet transmission.

DETAILED DESCRIPTION OF THE INVENTION

In the following detailed description of the present invention, a system and method using a scaleable priority arbiter circuit for arbitrating between multiple FIFO entry point circuits for data packets of differing priority level, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NIC HAVING QUEUED TRANSMIT ENTRY POINT CIRCUIT

Figure 1A:
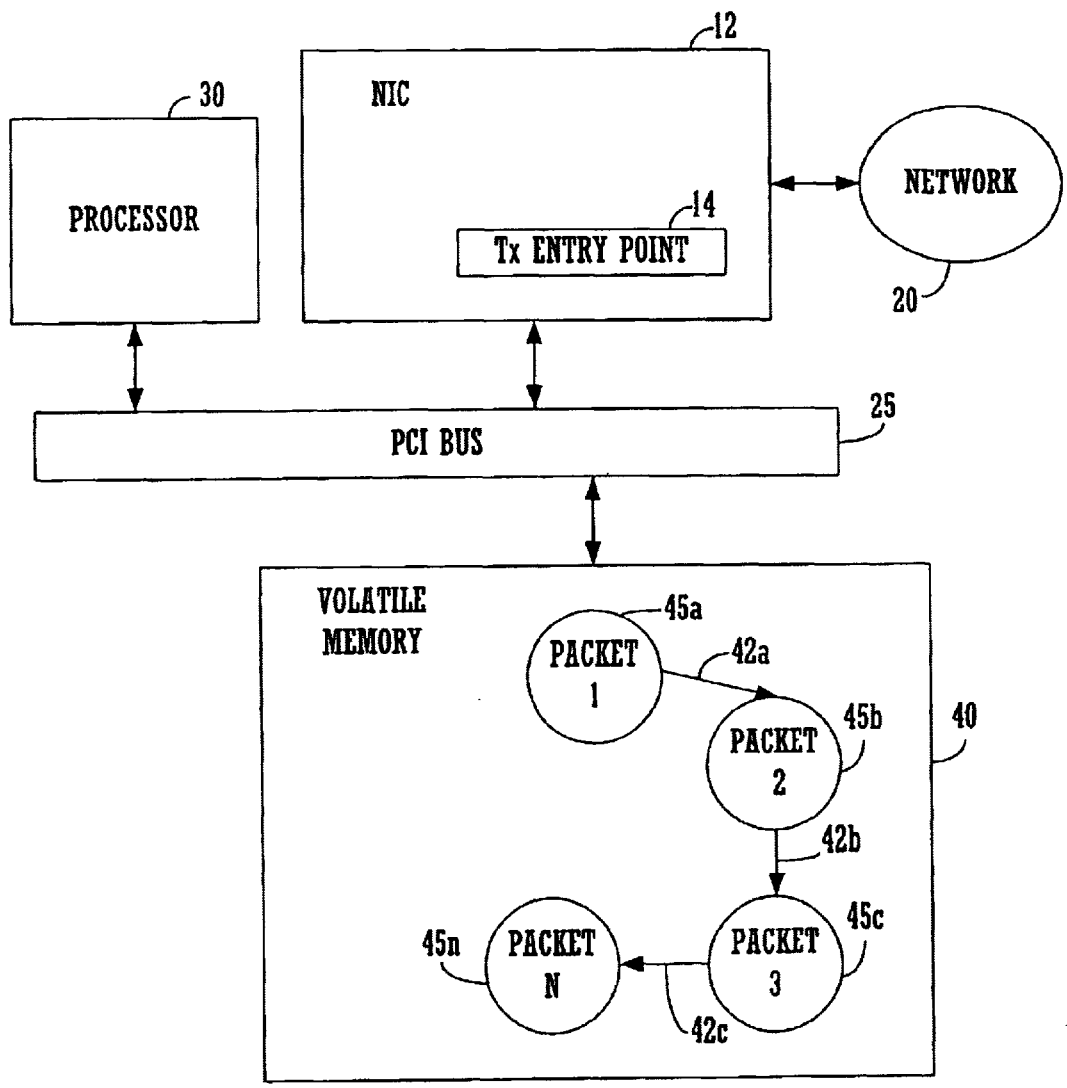
FIG. 1A is a block diagram of a prior art communication system.
Figure 2:
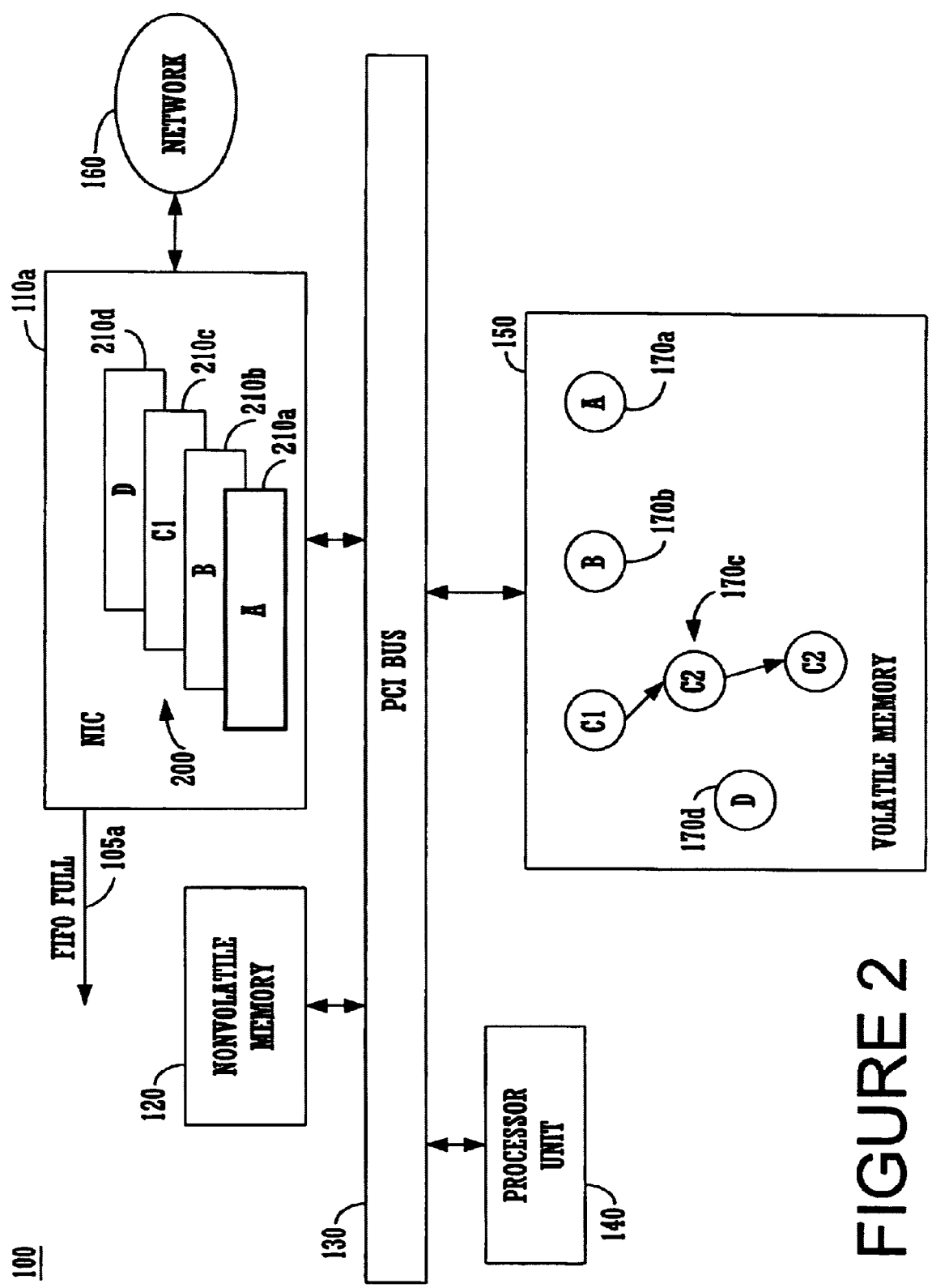
FIG. 2 is a block diagram of the communication system in accordance with one embodiment of the present invention including a network interface card (NIC) having a transmit (Tx) FIFO entry point circuit.

FIG. 2 illustrates a system 100 in accordance with an embodiment of the present invention. System 100 provides mechanisms as described herein to improve quality of service performance, reduce processor utilization in queuing data packets for communication with a network and provides an isochronous data stream with reduced data arrival jitter for multi-media and voice over data applications. System 100 includes a computer system having a processor 140 interfaced to a bus 130 and memory units 120 and 150 interfaced with the bus 130. Also interfaced with the bus 130 is a network interface card (NIC) 110a that is coupled to a computer and peripheral network 160.

Memory unit 120 is a non-volatile memory unit, e.g., a read only memory (ROM) and memory unit 150 is a volatile memory unit, e.g., a random access memory unit (RAM). Memory 150 is used to store data packets, e.g., 170a–170d, that are ready to be transmitted Onto network 160. Network 160 can be of a number of well known network architectures supporting a number of well known network protocols. In one embodiment, the network 160 is compliant with the Ethernet standard. In another embodiment, the network 160 is compliant with the IEEE 1394 serial communication standard. In one embodiment, the bus 130 is compliant with the Peripheral Component Interconnect (PCI) standard. In other embodiments of the present invention, the network 160 can be compliant with one or more of the following standards: the Home PhoneLine networking standard; the HomeRF networking standard; and the Home PowerLine networking standard.

The NIC 110a of the present invention contains a transmit first-in-first-out (FIFO) entry point circuit 200 for queuing data packets for transmission over network 160. The transmit FIFO entry point circuit 200 contains an entry point register 210a and a FIFO memory containing memory cells ("cells") 210b–210d which work in conjunction with each other. The number of cells within the transmit FIFO entry point circuit 200 can be of any size and therefore the FIFO memory can contain more cells which are not shown. Only cells having valid data are shown in FIG. 2. Five pointer entries (A, B, C1 and D) are shown for example only. As data is taken out of cell 210a (to transmit the corresponding data packet), the other cells 210b through 210d of the FIFO memory shift their data up one in the well known FIFO manner with the oldest data being placed into cell 210a. It is appreciated that the entry point register 210a is the only memory cell of transmit FIFO entry point circuit 200 that is visible to processor 140.

In the transmit FIFO entry point circuit 200, the pointers stored in the FIFO memory are called "downlist pointers" because they point to data packets stored in memory 150. For instance, pointer "A" in the entry point register 210a points to data packet 170a. Pointer "B" in cell 210b points to data packet 170b and pointer "C1" of cell 210c points to the start of the linked list of data packets 170c. Pointer "D" of cell 210d points to the data packet 170d. In this example, data packet 170a is the oldest data packet queued in the transmit FIFO entry point circuit 200 and data packet 170d is the newest data packet queued in the transmit FIFO entry point circuit 200. The data packet indicated by the pointer stored in the entry point register, e.g., packet 170a "A," is the packet being presently transmitted by NIC 110a.

The NIC 110a also generates a FIFO full signal over line 105a when the transmit FIFO entry point circuit 200 is full. The transmit FIFO entry point circuit 200 can become full if the network 160 is busy or down and the processor 140 continues to queue data packets for transmission over network 160. When line 105a is asserted, the processor 140 is interrupted and informed of the FIFO full status.

The entry point register 210a of transmit FIFO entry point circuit 200 of FIG. 2 performs a number of functions. As stated above, it is the only register of transmit FIFO entry point circuit 200 that is visible to processor 140. Processor 140 addresses this entry point register 210a when queuing up a new data packet pointer for transmission onto network 160. The processor 140 stores the new data packet pointer into the entry point register 210a and immediately, the entry point register 210a places the new data packet pointer onto the last vacant cell of the FIFO memory (e.g., cells 210b–210d). At all times, the entry point register 210a maintains the oldest pointer of the FIFO memory. Therefore, while the entry point register 210a is used to receive new pointers and store them into the FIFO memory, it nevertheless maintains the oldest pointer within the FIFO memory. In this fashion, the processor 140 does not need to scan the FIFO memory to locate a vacant spot, but only has to address one location for storing new data pointers.

Because the NIC 110a maintains the transmit FIFO entry point circuit 200, the processor 140 can store new data packet pointers into the entry point register 210a without stalling the NIC 110a. Unless the transmit FIFO entry point circuit 200 is full, the entry point register 210a is always available to receive new data packet pointers and can do so without NIC stalling and without creating any race conditions as is problematic for the prior art. This is the case, because at all times, a vacant entry in the transmit FIFO entry point circuit 200 is always going to be the next data packet used for transmission, regardless of the transmission status the NIC 110a. The processor 140 need only to store the new data packet pointer into the entry point register 210a and it will automatically be moved backwards into the FIFO memory.

Figure 3:
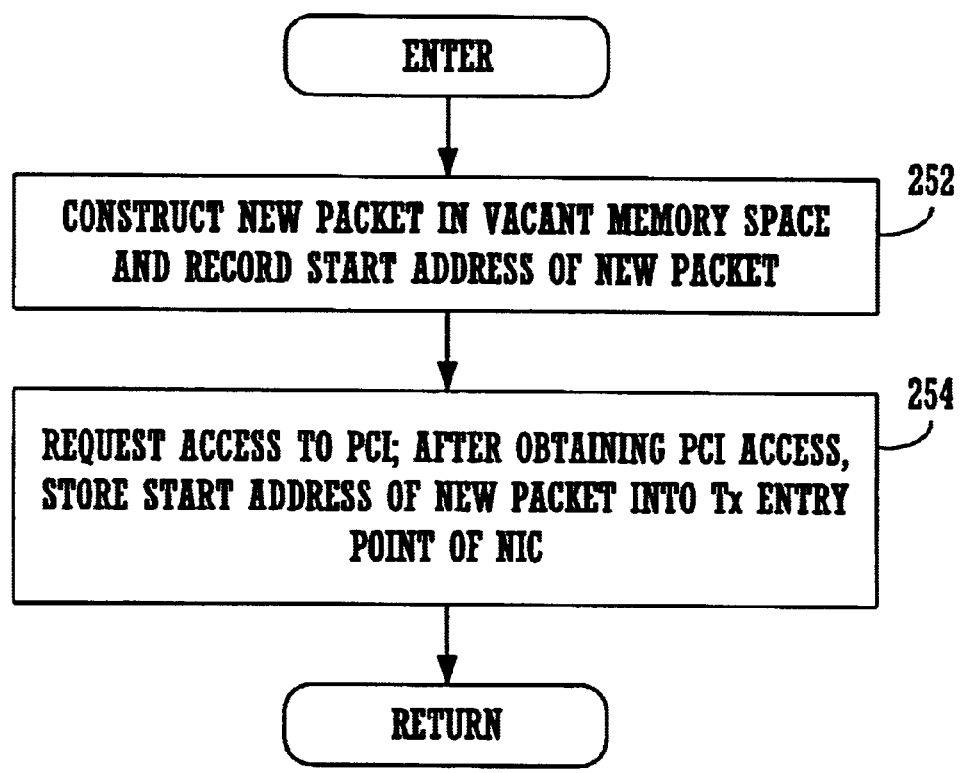
FIG. 3 is a flow diagram of steps performed by the communication system of the embodiment of the present invention depicted in FIG. 2 for queuing a data packet transmission.

FIG. 3 illustrates a flow diagram of steps 250 used by the processor 140 for queuing a data packet for transmission onto network 160. Because the transmit FIFO entry point circuit 200 eliminates the worries of race conditions for the processor 140, the steps required to perform the queuing functions are dramatically reduced compared to the prior art mechanism. At step 252, the processor 140 constructs a new data packet, e.g., data packet "E," in memory 150. The start address of the data packet "E" is then recorded. At step 254, assuming the transmit FIFO entry point circuit 200 is not full, processor 140 requests access to the PCI bus 130. Processor 140 then waits for the bus access grant, and stores the start address of data packet "E" (e.g., a pointer to data packet "E") into the entry point register 210a of transmit FIFO entry point circuit 200 of NIC 110a. Process 250 then returns. It is appreciated that within process 250 of the present invention, there is no need to stall and unstall NIC 110a to queue a new data packet for transmission.

Figure 4A:
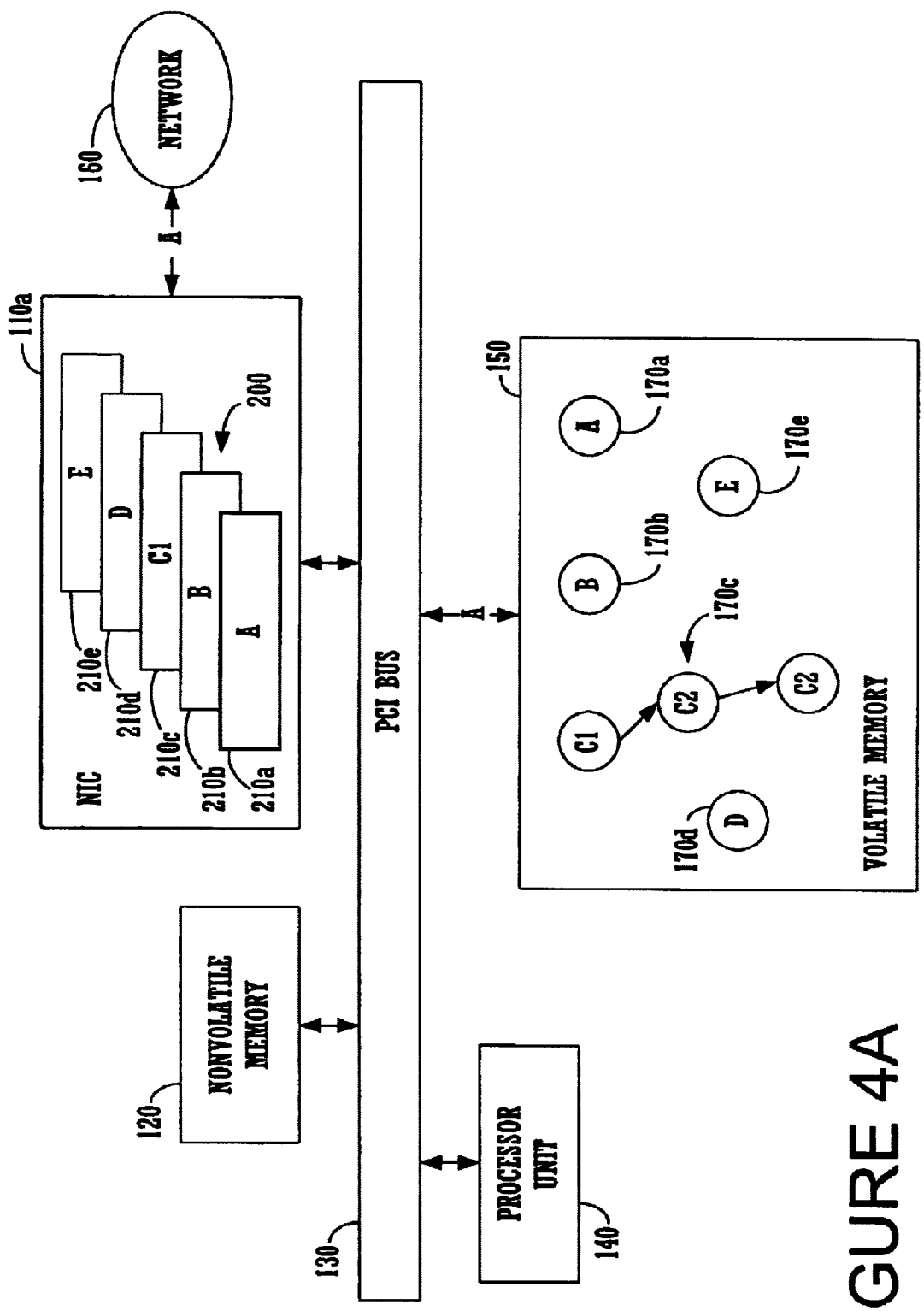
FIG. 4A is another block diagram of one status of the communication system in accordance with one embodiment of the present invention including a NIC having a Tx FIFO entry point circuit.

FIG. 4A illustrates the state of the transmit FIFO entry point circuit 200 after process 250 (FIG. 3) executes. After obtaining the new pointer for data packet "E," the entry point register 210a places pointer "E" into the next vacant cell of the FIFO memory, e.g., into cell 210e. The pointer "A" for data packet 170a remains in the entry point register 210. In this configuration, when the pointer "E" was loaded, NIC 110a was currently transmitting data packet A 170a as shown by the "A" data designation going from the memory 150 to bus 130 and from NIC 110a to network 160. It is appreciated that because no race conditions exist with respect to the processor 140 and NIC 110a in accordance with the present invention, the addition of the pointer "E" into cell 210e can be performed without interrupting the transmission of data packet A 170a.

Figure 4B:
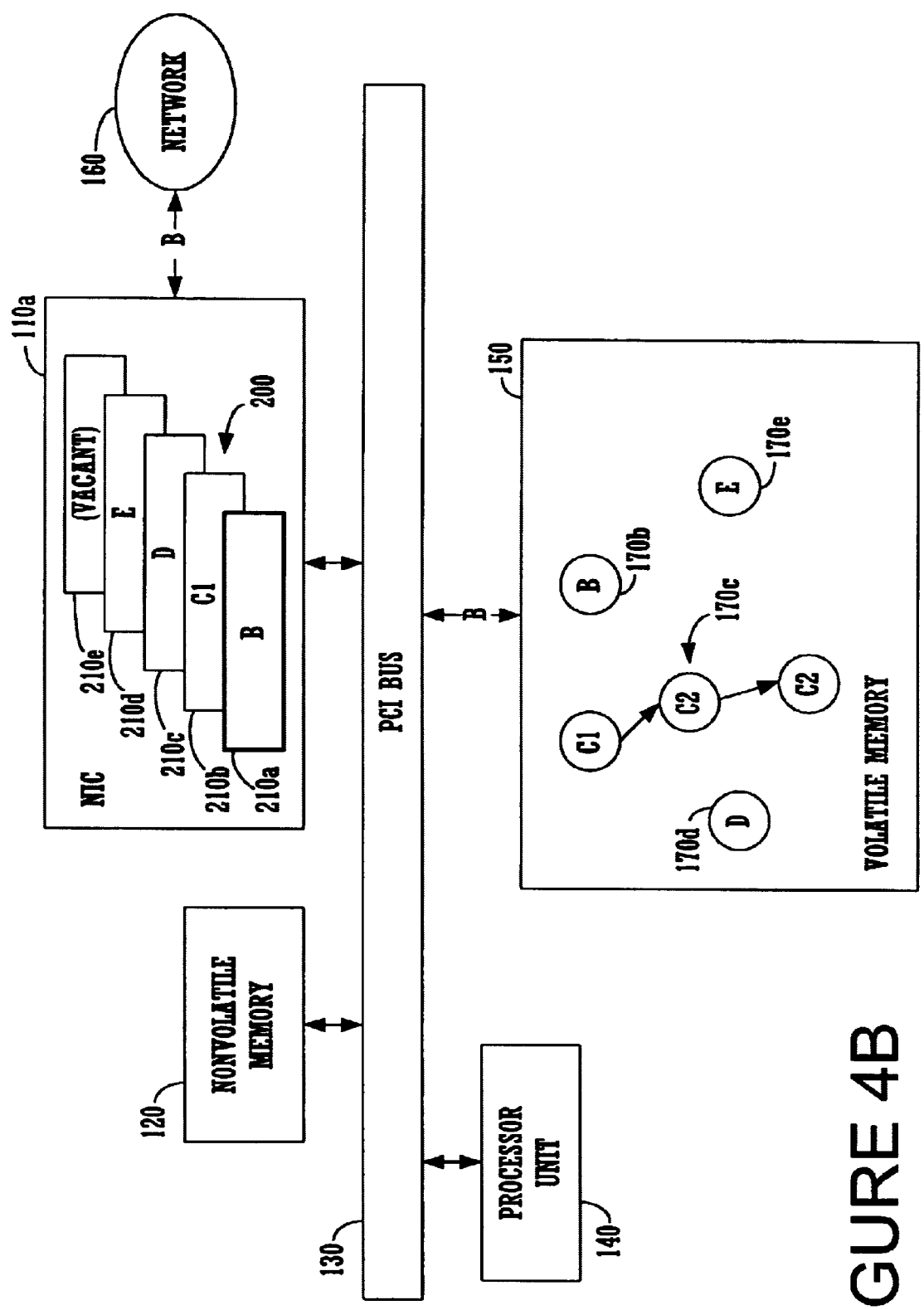
FIG. 4B is a block diagram of another status of the communication system in accordance with one embodiment of the present invention including a NIC having a Tx FIFO entry point circuit.

FIG. 4B illustrates the state of the transmit FIFO entry point circuit 200 after data packet A 170a has been transmitted over network 160. The pointers in the FIFO memory cell have each been shifted by one with the entry point register 210a containing pointer "B," cell 210b containing pointer "Cl," cell 210c containing pointer "D," and cell 210d containing pointer "E." Cell 210e is the next vacant cell within the transmit FIFO entry pointer circuit 200. In this configuration, NIC 110a is currently transmitting data packet B 170b as shown by the "B" data designation going from the memory 150 to bus 130 and from NIC 110a to network 160.

FULL DUPLEX NIC HAVING QUEUED ENTRY POINT CIRCUIT

Figure 5:
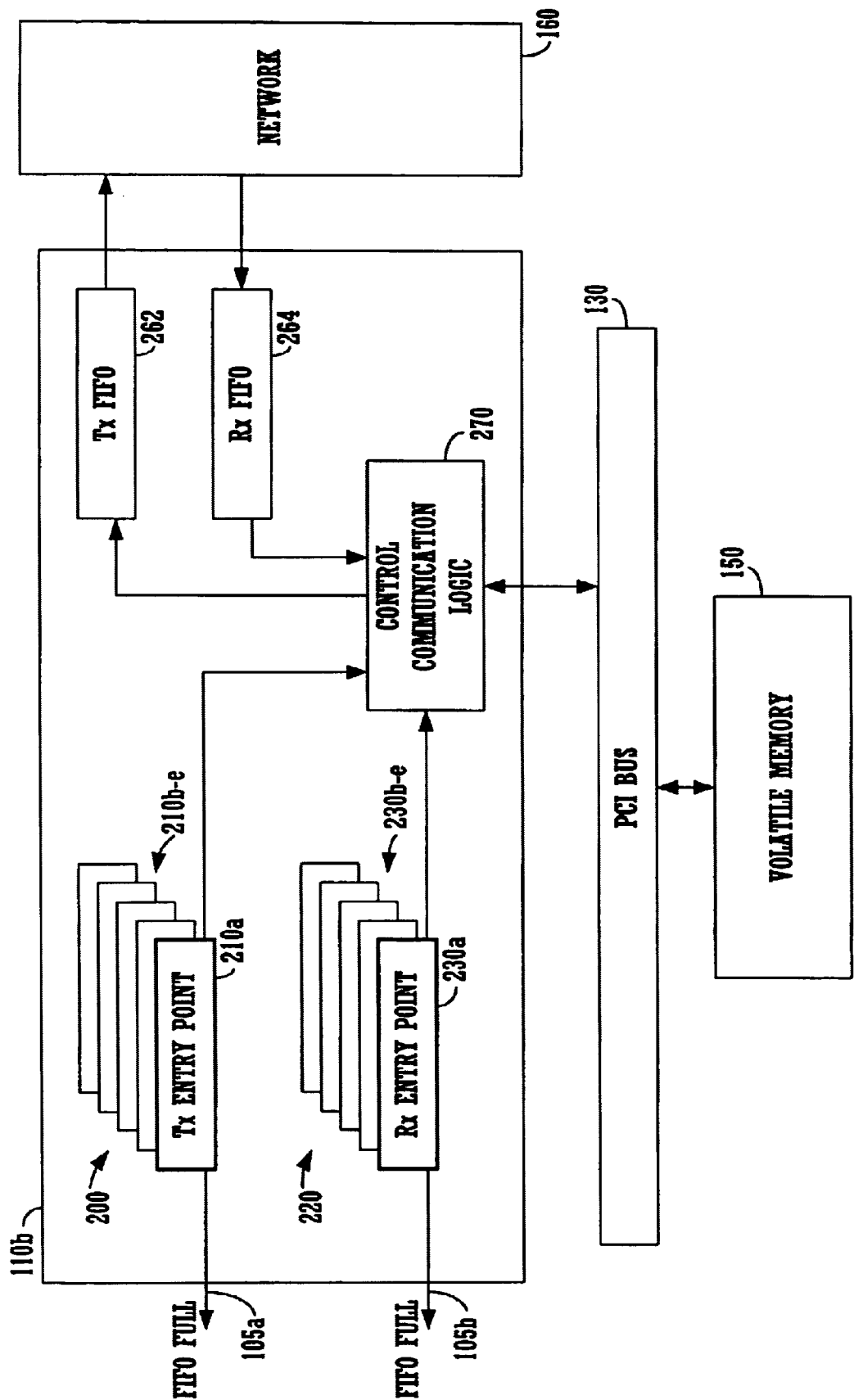
FIG. 5 is a block diagram of a full duplex embodiment of the communication system of the present invention including a NIC having a Tx FIFO entry point circuit and a receive (Rx) FIFO entry point circuit.

FIG. 5 illustrates a full duplex NIC 110b in accordance with another embodiment of the present invention. In full duplex, the NIC 110b can send and receive data packets at the same time with respect to network 160. In the fashion described with respect to FIG. 2, NIC 110b of FIG. 5 is coupled to bus 130 which is coupled to memory 150; NIC 110b is also coupled to network 160. NIC 110b contains a transmit FIFO entry point circuit 200 for queuing data packet transmissions and, to support full duplex, also contains a receive FIFO entry point circuit 220 for queuing data packets that are received from network 160. Transmit FIFO entry point circuit 200 generates a FIFO full signal over line 105a when it becomes full. Likewise, receive FIFO entry point circuit 220 generates a FIFO full signal over line 105b when it becomes full. Signals over lines 105a–105b interrupt processor 140. NIC 110b also contains a transmit (Tx) FIFO memory 262 and also a receive (Rx) FIFO memory 264. The Tx FIFO 262 receives digital data corresponding to a data packet and transmits this data over network 160. The Rx FIFO 264 receives digital data from network 160 corresponding to a data packet.

A control communication logic circuit 270 is also contained within NIC 110b. Control circuit 270 is coupled to receive data from memory 150, via bus 130 and is also coupled to supply data to memory 150 via bus 130. Circuit 270 is coupled to the transmit FIFO entry point circuit 200 and is coupled to the Tx FIFO 262. During data packet transmission, circuit 270 obtains a data packet pointer from the transmit entry point register 210a, accesses the corresponding data packet from memory 150 (via bus 130) and supplies the data for the corresponding data packet to the Tx FIFO 262 which transmits this data over network 160. When the transmission completes, the control circuit 270 signals the transmit FIFO entry point circuit 200 to update its contents. This continues until the transmit FIFO entry point circuit 200 is empty or if the network 160 is busy or down.

The receive FIFO entry point circuit 220 of FIG. 5 operates similarly to the transmit FIFO entry point circuit 200 but operates for data packets that are received by NIC 110b from the network 160. Also, the pointers maintained in the receive FIFO entry point circuit 220 correspond to vacant memory spaces (of memory 150) for receiving data packets. In other words, the receive FIFO entry point circuit 220 maintains a queue of pointers to memory locations within memory 150 that are to receive new data packets from the network 160. The receive FIFO entry point circuit 220 contains an entry point register 230a and a FIFO memory which contains cells 230b–e. The cells 230b–e contain queued uplist pointers to memory spaces for receiving data packets. To this end, circuit 270 is coupled to the receive FIFO entry point circuit 220 and is coupled to the Rx FIFO 264.

During data packet receiving, circuit 270 obtains a memory space pointer from the receive entry point register 230a, receives the corresponding data packet from Rx FIFO 264 and supplies the data for the corresponding data packet to the designated memory space within memory 150 (via bus 130). When the receiving operation completes for the data packet, the control circuit 270 signals the receive FIFO entry point circuit 220 to update its contents. It is appreciated that of the receive FIFO entry point circuit 220, only the receive entry point register 230a is visible to processor 140 and this register operates to accept pointer information in an analogous fashion as the transmit FIFO entry point circuit 200. It is also appreciated that control circuit 270 can process a data packet being transmitted simultaneously with a data packet being received.

Figure 6:
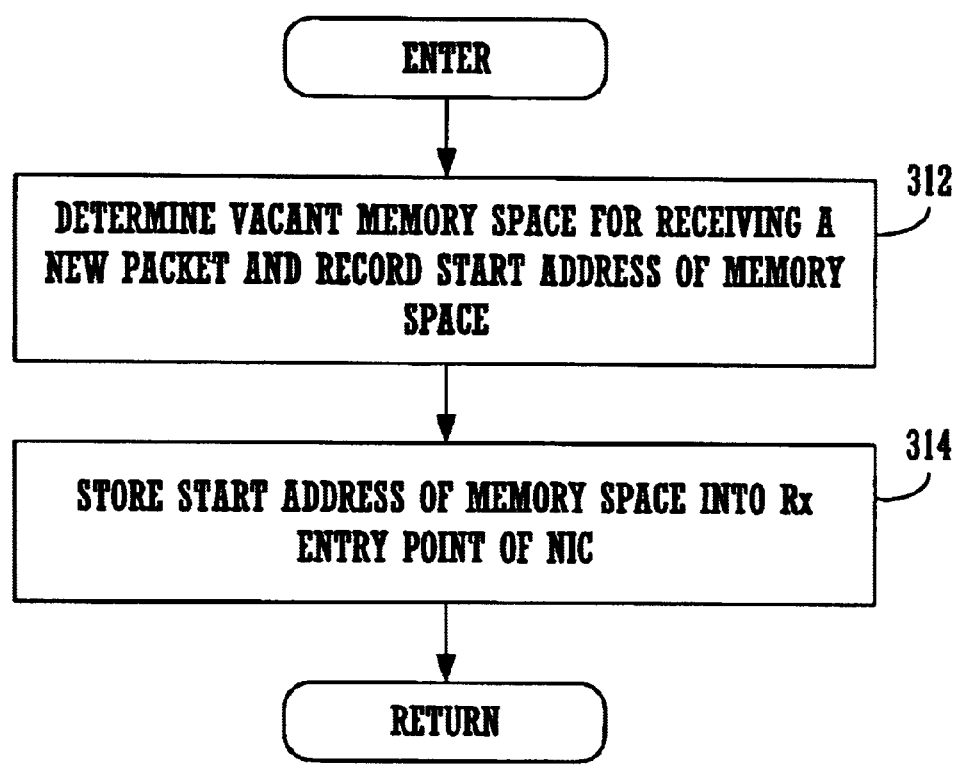
FIG. 6 is a flow diagram of steps performed by the communication system of the embodiment of the present invention depicted in FIG. 5 for receiving a packet of data.

FIG. 6 is a flow diagram of the steps 310 performed for queuing memory space pointers into the receive FIFO entry point circuit 220 of the present invention. At step 312, the processor 140 determines a vacant memory space within memory 150 and records the start address of the memory space. At step 314, the processor 140 requests PCI bus access, obtains the bus access grant and stores the start address determined at step 312 into the entry point register of the receive FIFO entry point circuit 220 of NIC 110b. Step 314 does not require a NIC stall. Therefore, within process 310 of the present invention, there is no need to stall and unstall NIC 110b to queue a memory space for receiving a data packet.

DATA PACKET TRANSMISSION PRIORITIES

Figure 7:
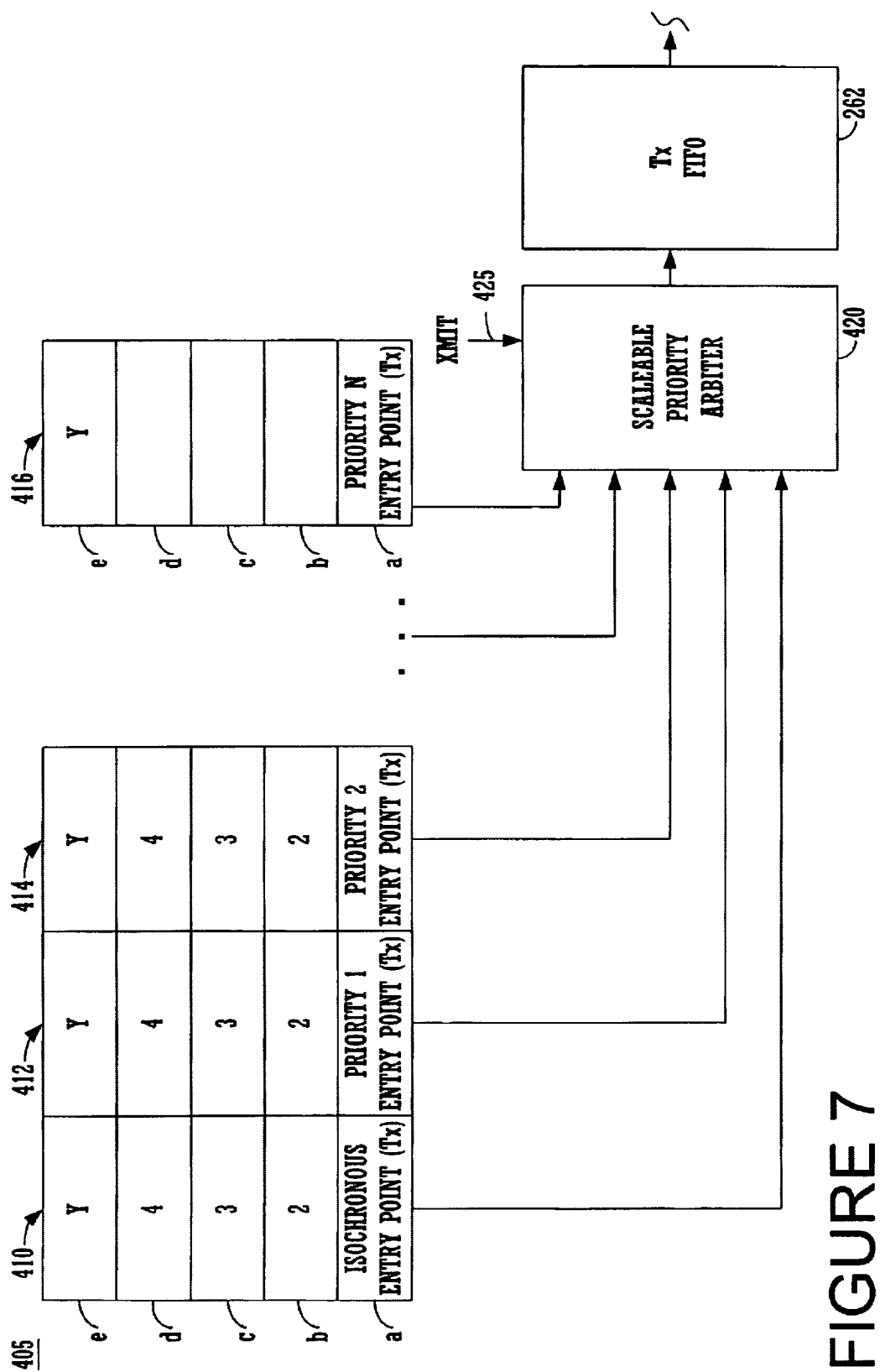
FIG. 7 is an embodiment of the present invention providing multiple Tx FIFO entry point circuits for data packets having different transmission priorities.

FIG. 7 illustrates an embodiment of the present invention for queuing up and arbitrating between data packets having different transmission priority levels. It is appreciated that the Ethernet standard, IEEE 802.3 P/Q, defines a data packet field in which priority information can be placed for the data packet. In one embodiment of the present invention, this priority designation mechanism is used for typing data packet priorities. High priorities, e.g., isochronous and asynchronous priority "1" can be reserved for important, time critical transmissions like voice, video and multi-media content transmissions while lower priorities can be reserved for electronic mail messages, background transfers, etc. Circuit 405 resides within a NIC and supports N different types of data packet transmission priority types as well as an isochronous data packet type. In one embodiment of the present invention, the transmission FIFO entry point circuit 200 of NIC 110a or NIC 110b can be replaced by circuits 410–416 along with arbiter 420 to provide the NIC with an efficient mechanism for queuing and arbitrating among data packets of different transmission priority types.

Circuit 405 of FIG. 7 provides a separate transmit FIFO entry point circuit 410–416 for each different transmission priority level ("type"). One FIFO queue is for isochronous streaming data and one or more FIFO queues are for prioritized asynchronous data. In one embodiment, the memory allocated for these queues can be from 2k to 128k bytes. The isochronous type is the highest priority type and priority "1" is the second highest and so forth. For example, transmission FIFO entry point circuit 410 is reserved for all isochronous data packets. Transmission FIFO entry point circuit 412 is reserved for all data packets having transmission priority "1," transmission FIFO entry point circuit 414 is reserved for all data packets having transmission priority "2," and transmission FIFO entry point circuit 416 is reserved for all data packets having transmission priority "N." N can be of any size. If N is two, then three different transmission priorities are supported, high, medium and low where isochronous is high priority, priority 1 is medium priority and priority 2 is low priority. According to the arbiter circuit 420, isochronous streaming data is transmitted at a fixed interval to minimize packet jitter which is important for multimedia applications.

Each of the transmission FIFO entry point circuits 410–416 of FIG. 7 contain a separate entry point register 410a–416a, respectively. Each of the transmission FIFO entry point circuits 410–416 also contain a number of FIFO memory of cells designated as 410b–e through 416b–e. For isochronous data packets, processor 140 loads the data packet pointers into transmission entry point register 410a and they are queued into cells 410b–410e. For data packets of transmission priority "1," processor 140 loads the data packet pointers into transmission entry point register 412a and they are queued into cells 412b–412e. For data packets of transmission priority "2," processor 140 loads the data packet pointers into transmission entry point register 414a and they are queued into cells 414b–414e. For data packets of transmission priority "N," processor 140 loads the data packet pointers into transmission entry point register 416a and they are queued into cells 416b–416e. After receiving a new data packet pointer, the respective entry point register acts to queue the pointer within its associated FIFO memory as described above with respect to NICs 110a–110b. As discussed with respect to NICs 110a–110b, each entry point register of registers 410a–416a contain the oldest queued pointer for each respective transmission priority type.

The transmission FIFO entry point circuits 410–416 act to provide a queuing function for the data packets of their associated priority type, in the analogous fashion as described above with respect to NICs 110a–110b. Only one data packet is transmitted by the NIC at any one time. Therefore, circuit 405 also contains a scaleable priority arbiter 420 for selecting a next data packet for transmission among the data packets queued in the entry point registers 410a–416a. The scaleable arbiter 420 receives pointers from the entry point registers 410a–416a of all transmission FIFO entry point circuits 410–416. On each transmission opportunity (as indicated over line 425), the scaleable arbiter 420 selects a data packet pointer from the entry point registers 410a–416a which are all coupled to the scaleable arbiter 420. The selected data packet pointer is then obtained by the control circuit 270 and the packet data is read from memory 150 and fed to the Tx FIFO 262 for transmission.

By providing the arbitration functionality on the NIC, the processor 140 does not need to perform any arbitration functions for the data packets thereby reducing the workload on the processor 140. As described further below, the scaleable priority arbiter circuit 420 provides isochronous communication based on a fixed interval timer and provides other priority communication based on transmission status maintained within circuit stages of the arbiter circuit 420.

It is appreciated that in alternative embodiments of the present invention, a similar circuit to circuit 405 can be provided for receiving data packets that have different priorities. In such a circuit, multiple receive FIFO entry point circuits are maintained, one for each priority type. Each entry point register then feeds a receive arbiter for selecting a next entry.

SCALEABLE PRIORITY ARBITER CIRCUIT

Figure 8A:
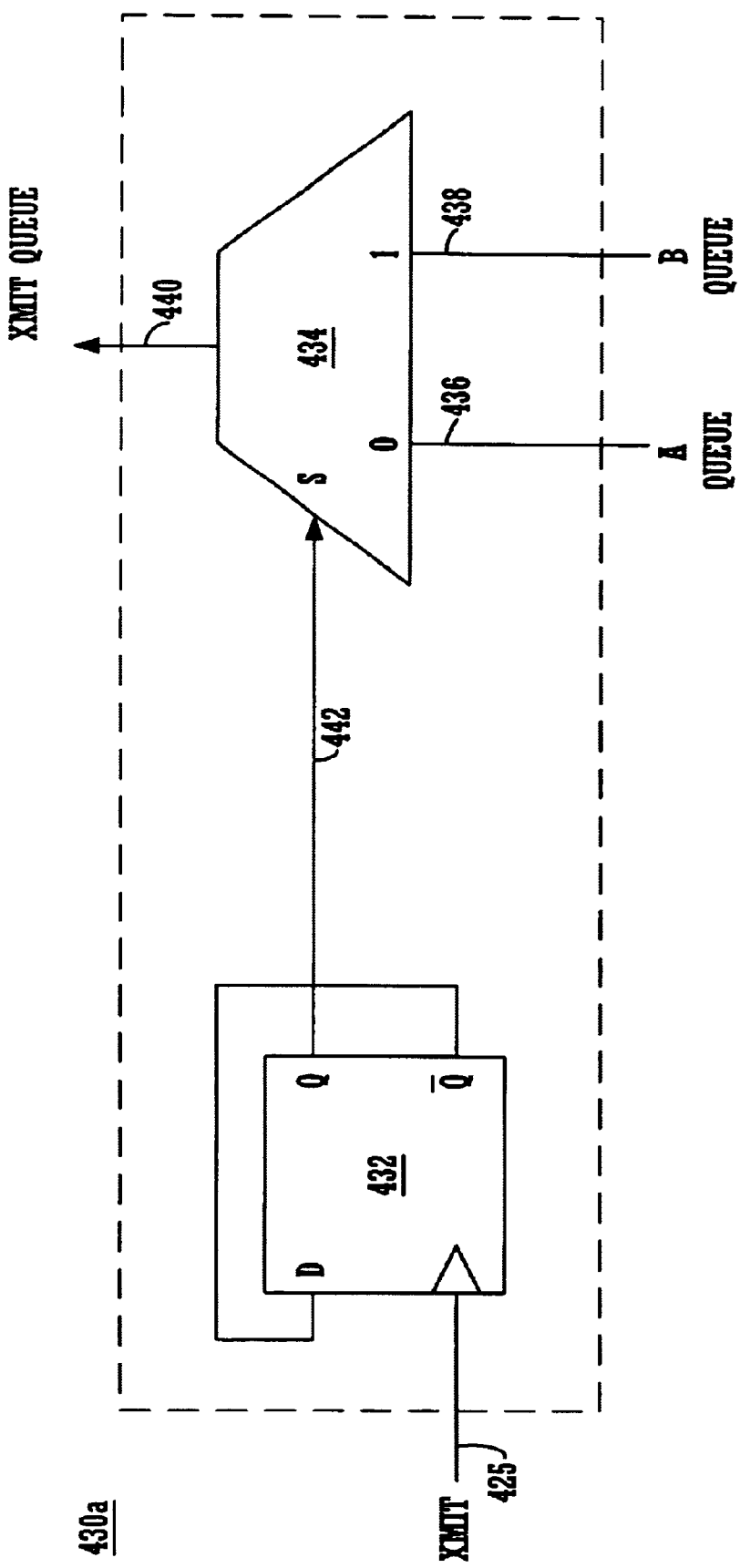
FIG. 8A is a circuit diagram of one circuit stage of the scaleable priority arbiter circuit in accordance with an embodiment of the present invention.
Figure 8B:
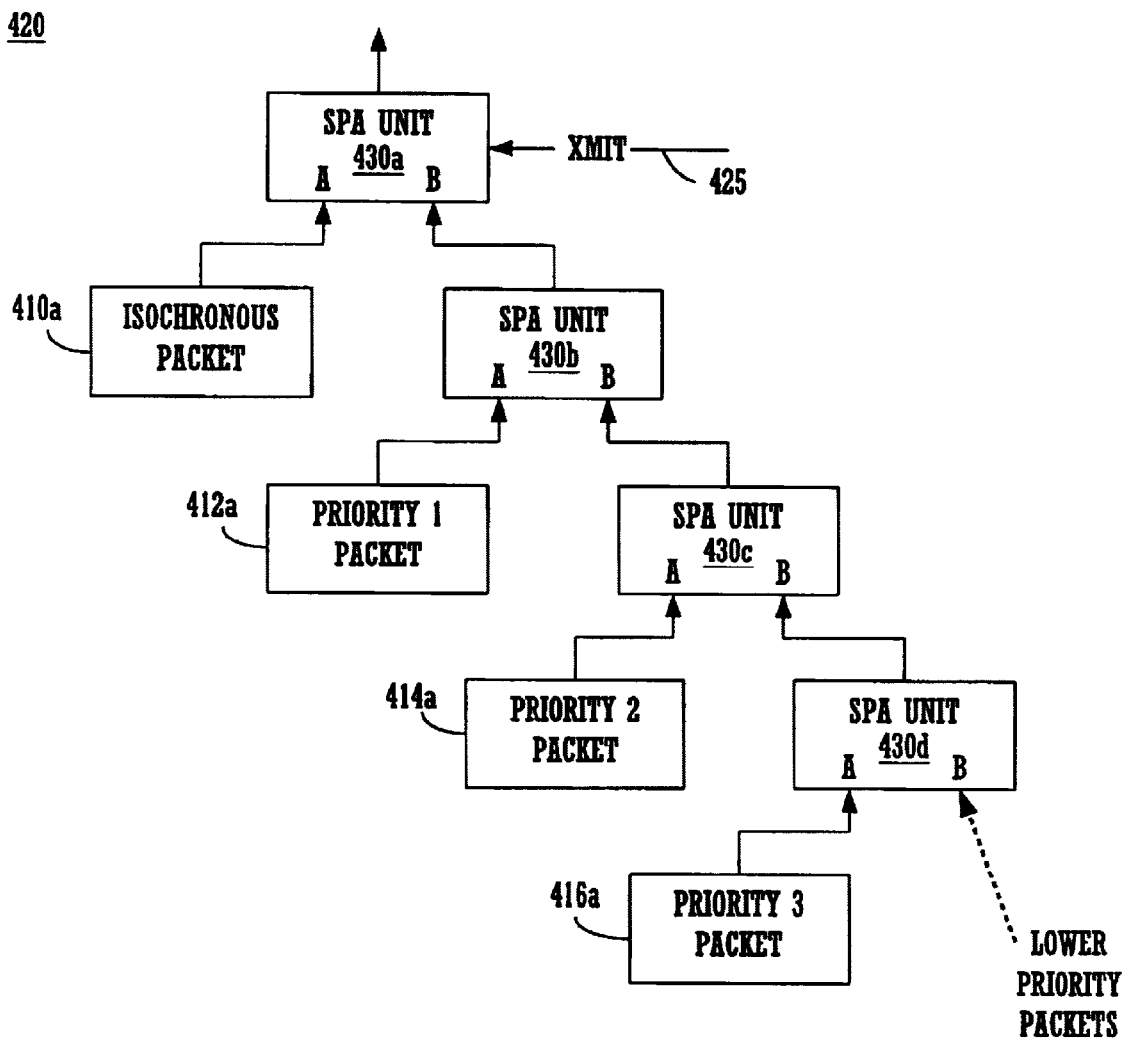
FIG. 8B is a block diagram of the multi-stage scaleable priority arbiter circuit of the present invention including multiple circuit stages.

Refer to FIG. 8A and FIG. 8B which illustrate an embodiment of the scaleable priority arbiter circuit 420 of the present invention. Arbiter circuit 420 is a multi-staged circuit having one stage for each separate transmission priority supported in the NIC. Asynchronous data is ordered by the arbiter circuit 420 in such a way to allocate more bandwidth for higher priority data than lower priority data, but no single type of data will be denied access to the network 160. This is accomplished by using a scaleable arbiter for selecting which data to transmit at a given time. The approach reduces processor utilization and improves data throughput.

Scaleable arbiter circuit 420 contains exemplary stages 430a–430d. In FIG. 8B, four different priorities are supported, isochronous and asynchronous priorities 1–3. Each stage of the multi-staged circuit 420 is replicated and a representative stage 430a is shown in FIG. 8A. Stage 430a contains a sequential element (e.g., a D flip flop) configured in a toggle mode wherein the inverse output (Q bar) is coupled back into its D input. The circuit 432 is clocked by the transmit signal 425. Signal 425 is pulsed when the stage 430a transmits a packet. The non-inverting output (Q) is fed to a select input of a multiplexer circuit 434. A first input ("A") 436 of the multiplexer 434 is configured to couple with the entry point register of the transmission FIFO entry point circuit that shares the same priority as the stage 430a. For instance, as shown in FIG. 8B, input "A" of stage 430a is coupled to entry point register 410a. Regarding the other stages, input "A" for stage 430b is coupled to entry point register 412a, input "A" for stage 430c is coupled to entry point register 414a, etc.

The second input ("B") of multiplexer 438 of FIG. 8A is coupled to the output of its downstream stage 430b. The output multiplexer 438 is the output of the scaleable arbiter 420. The output of each other stage 430b–430c is coupled to the "B" input of its upstream stage. The sequential circuit of each other stage 430b–430c is clocked whenever the stage transmits a packet of its own priority level.

As shown in FIG. 8B, scaleable arbiter circuit 420 is a multi-staged circuit having one stage for each separate transmission priority and contains exemplary stages 430a–430d. The first stage 430a is triggered based on a predetermined time interval that first allows an isochronous data packet to be transmitted through its input A. After transmission, input B can be selected which gives a downstream priority stage an opportunity to transmit. Based on the toggle activity of each sequential circuit, and assuming all stages always have packets to transmit, in one embodiment, ½ bandwidth is given to the isochronous transmissions, ¼ to priority 1 packets, ⅛ to priority 2 packets and so forth. However, on any stage's transmission turn, if it does not have a data packet of its own priority for transmission, then it automatically selects its input "B" to allow a downstream priority an opportunity to transmit a packet. Once a stage transmits some data of its associated transmission priority, it automatically toggles it sequential circuit for its next transmission turn. The arbiter 420 is scaleable by adding more stages to the "B" input of the last stage, e.g., stage 430d, to process lower priority packets.

It is appreciated that the scaleable priority arbiter circuit 420 of the present invention can also be used with multiple receive FIFO entry point circuits, one for each data priority level (as discussed above). In this case, the scaleable priority arbiter circuit 420 rather than selecting a data pointer for transmission (as described above) would be selecting the mechanism for storing the received data packets into memory 150.

Figure 9:
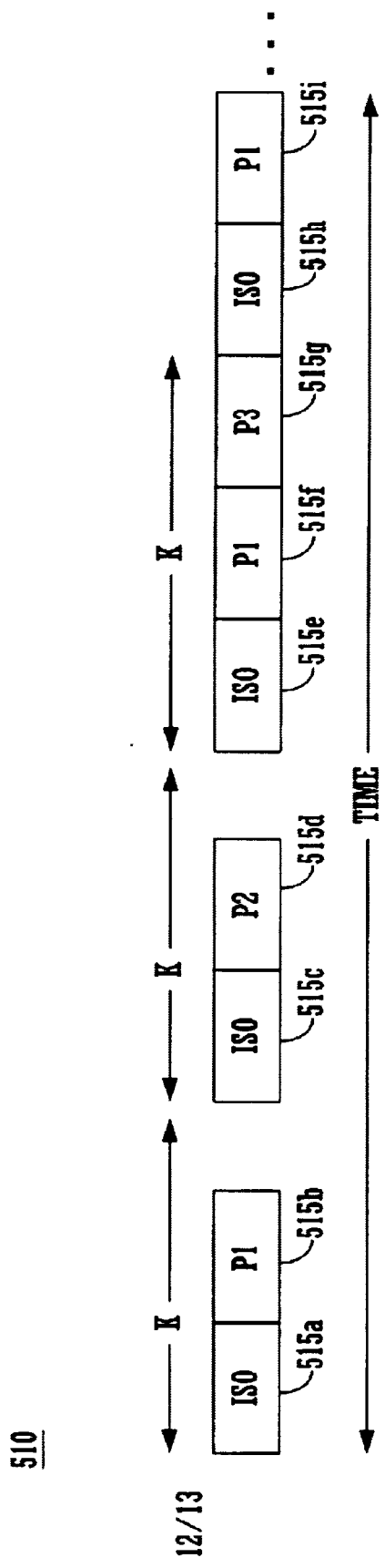
FIG. 9 is a timing diagram illustrating exemplary data packets that are transmitted by the NIC of one embodiment of the present invention containing a scaleable priority arbiter circuit with multiple Tx FIFO entry points for different priority data packets.

FIG. 9 illustrates a timing diagram of exemplary data packets selected for transmission by the scaleable priority arbiter 420 of the present invention. On each fixed time interval of duration K, an isochronous packet is allowed to be transmitted as shown by isochronous data packets 515a, 515c, 515e and 515h. After the first isochronous packet is transmitted, circuit stage 430a (FIG. 8B) then toggles over and allows stage 430b an opportunity to transmit a priority 1 data packet 515b. No other packets are pending for transmission at this point. On the next time interval K, stage 430a is allowed to transmit another isochronous data packet at 515c. After the isochronous packet 515c is transmitted, stage 430b is given an opportunity to transmit, but since on its last turn it transmitted packet 515b, it gives lower priority circuit stage 430c a transmission turn. Therefore, stage 430c selects a priority 2 data packet 515d to transmit. No other packets are pending for transmission at this point.

On the next time interval K, stage 430a is allowed to transmit another isochronous data packet at 515e. After the isochronous packet 515e is transmitted, stage 430a then toggles over and allows stage 430b a turn to transmit a priority 1 data packet 515f which is taken because on its last turn circuit stage 430b did not transmit. A transmission turn is then given to stage 430a which has no data packet, and then allows stage 430b a turn which transmitted last turn (515f) so it gives stage 430c a turn which also transmitted on its last turn (515d) so it gives stage 430d a turn which selects a priority 3 packet 515g. On the next time interval, stage 430a is allowed to transmit another isochronous data packet at 515h. After the isochronous packet 515h is transmitted, stage 430a then toggles over and allows stage 430b an opportunity to transmit a priority 1 data packet 515i which is taken because on its last turn stage 430b did not transmit.

As seen by the above timing diagram, each asynchronous packet stage of the scaleable priority arbiter circuit 420 performs the following functions. On its transmission turn, it selects from input A if (1) a data packet is on input A and (2) it selected from input "B" on its last turn. On its transmission turn, it selects from input B if on its last turn it selected from input "A." When selecting from B, a stage allows the next downstream stage to perform the above logic. This continues until a data packet is selected or a waiting period is entered for the next timer interval to elapse or for a new data packet to arrive. Stage 430a (isochronous data packets) is slightly different because it is entered on each timer interval K. Stage 430a transmits from input "A" if (1) it has an isochronous data packet available and (2) the timer interval elapsed, otherwise, it selects input "B."

Figure 10:
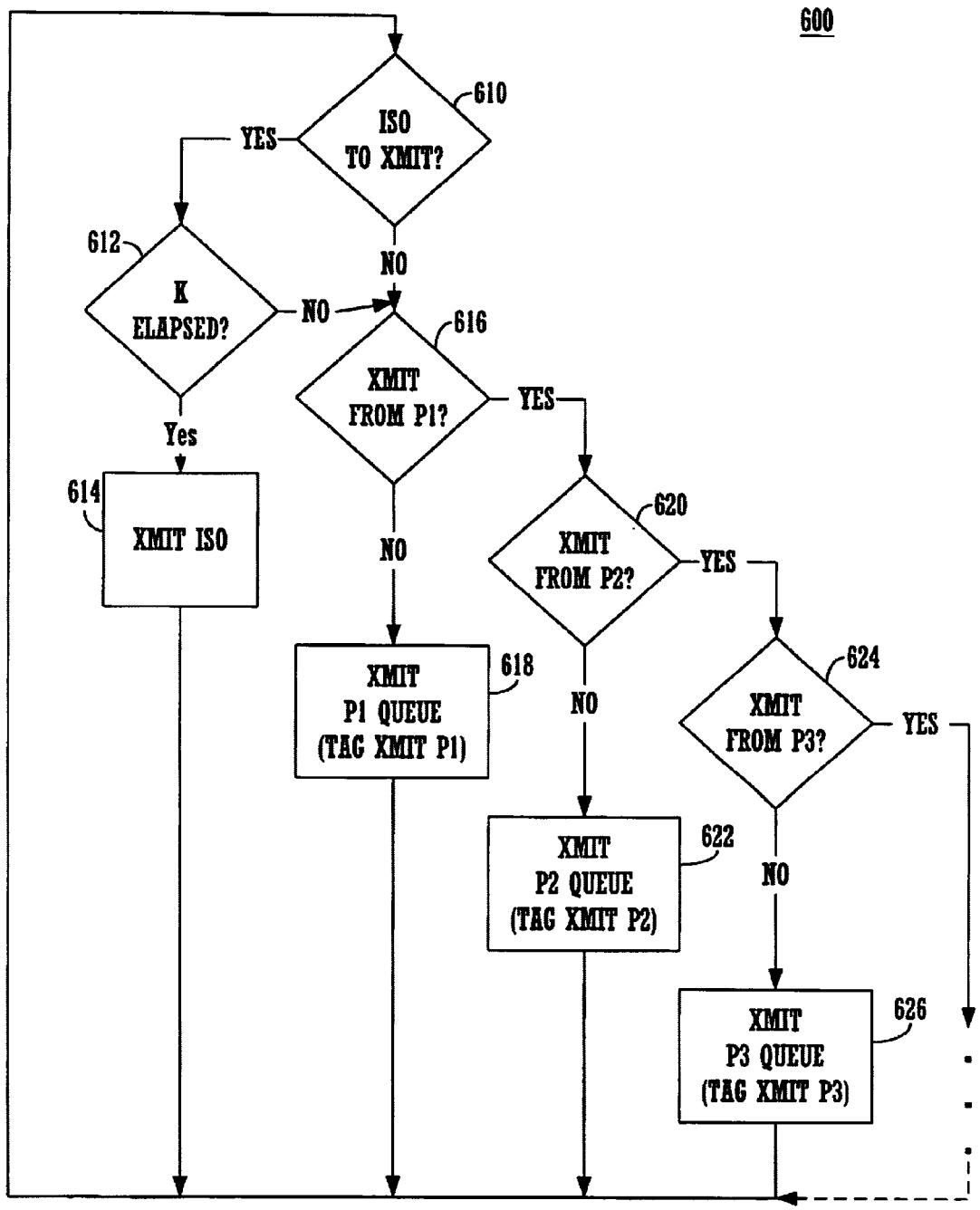
FIG. 10 is an exemplary flow diagram of steps performed by the scaleable priority arbiter circuit of one embodiment of the present invention for selecting a data packet for transmission.

FIG. 10 illustrates a flow diagram of steps 600 performed by four exemplary circuit stages of the arbiter circuit 420 of the present invention for selecting a next data packet for transmission among the data packets of queues 410–416 (FIG. 7). At step 610, the first stage 430a of the arbiter circuit 420 checks if there is an isochronous data packet for transmission on its "A" input. If so, then step 612 is entered, otherwise step 616 is entered. At step 612, a check is made if the K time interval of FIG. 9 has elapsed. If no, then step 616 is entered to give a lower priority data packet a transmit turn. If yes at step 612, then at step 614, the first stage circuit 430a passes through the pointer to the corresponding isochronous data packet on its input "A" to the control circuit 270 which transmits the selected data packet from memory 150 to the Tx FIFO 262. Then step 610 is entered again.

At step 616, a check is made by the second stage circuit 430b if the last time step 616 was entered a priority "1" data packet was selected for transmission by stage 430b. If so, then a lower priority data packet is given a transmit turn, and step 620 is entered. Step 620 is also entered from step 616 if no priority "1" data packets are present. If conditions are satisfied at step 616 (e.g., a packet exists for stage 430b and on its last turn stage 430b did not transmit a data packet), then at step 618, a priority "1," data packet is selected for transmission by the second stage 430b and this transmission is recorded by circuit stage 430b. Step 610 is then entered.

At step 620 of FIG. 10, a check is made by the third stage circuit 430c if the last time step 620 was entered a priority "2" data packet was selected for transmission by stage 430c. If so, then a lower priority data packet is given a transmit turn, and step 624 is entered. Step 624 is also entered from step 620 if no priority "2" data packets are present. If conditions are satisfied at step 620, then at step 622, a priority "2" data packet is selected for transmission by the third stage 430c and this transmission is recorded by circuit stage 430c. Step 610 is then entered.

At step 624 of FIG. 10, a check is made by the fourth stage circuit 430d if the last time step 624 was entered a priority "3" data packet was selected for transmission by stage 430d. If so, or if no priority "3" data packets are present, then a lower priority data packet is given a transmit turn and other steps as shown by the dashed line can be entered. (If no other circuit stages are present, then step 610 is entered). If conditions are satisfied at step 624, then at step 626, a priority "3" data packet is selected for transmission by the fourth stage 430d and this transmission is recorded by circuit stage 430d. Step 610 is then entered.

It is appreciated that the above discussion regarding the scaleable priority arbiter circuit 420 assumes that what is received and selected is a pointer to a data packet in memory 150. However, in an alternate embodiment of the present invention, the scaleable priority arbiter circuit 420 selects the actual data packet itself which is maintained in its entirely within the corresponding transmission FIFO entry point circuits.

The preferred embodiment of the present invention, a system and method using a scaleable priority arbiter circuit for arbitrating between multiple FIFO entry point circuits for data packets of differing priority level, is described. While the present invention has been described in particular embodiments, it should be appreciated that the present invention should not be construed as limited by such embodiments, but rather construed according to the below claims.

What is claimed is:

1. A network adapter card for coupling with a computer system having a processor and a memory unit, said network adapter card comprising:
   a plurality of queued transmit entry point circuits, each for queuing data packets of a respective transmission priority and each comprising:
      a transmit entry point register; and
      a plurality of memory cells configured as a first-in-first-out (FIFO) memory circuit, said transmit entry point register for receiving, from said processor, new data packet pointers to data packets of said respective transmission priority and also for queuing said new data packet pointers into said FIFO memory circuit, said transmit entry point register also for maintaining the oldest queued data packet pointer of said FIFO memory circuit;
   a transmit FIFO memory circuit for storing digital data to be transmitted onto a network; and
   a control circuit for accessing digital data from a memory space of said memory unit of said computer system and for supplying said digital data to said transmit FIFO memory circuit, said memory space being identified by an oldest queued data packet pointer as maintained by a selected one of said plurality of queued transmit entry point circuits.

2. A network adapter card as described in claim 1 further comprises an N stage scaleable priority arbiter circuit for selecting said selected one of said plurality of queued transmit entry point circuits wherein at least N transmission priorities exist.

3. A network adapter card as described in claim 1 wherein, for a respective queued transmit entry point circuit, its transmit entry point register is the only memory cell, of said respective queued transmit entry point circuit, that is visible to said processor.

4. A network adapter card as described in claim 1 wherein, for a respective queued transmit entry point circuit, its queued transmit entry point circuit supplies its control circuit with a next-in-order data packet pointer upon completion of each data packet transmitted of its corresponding transmission priority.

5. A network adapter card as described in claim 1 wherein each respective queued transmit entry point circuit further comprises an overflow circuit for generating a FIFO full signal for said processor when said respective queued transmit entry point circuit is full.

6. A network adapter card as described in claim 1 further comprising:
   a receive FIFO memory circuit for receiving digital data from said network; and
   a queued receive entry point circuit comprising a receive entry point register and a plurality of memory cells configured as a FIFO memory circuit, said receive entry point register for receiving new memory space pointers and for queuing said new memory space pointers into said FIFO memory circuit of said queued receive entry point circuit, said receive entry point register for maintaining the oldest queued memory space pointer of said queued receive entry point circuit; and
   wherein said control circuit is also for storing digital data from said receive FIFO memory circuit to said memory unit of said computer system at a memory space indicated by said memory space pointer maintained by said FIFO receive entry point register.

7. A computer system comprising:
   a processor coupled to a bus; a memory unit coupled to said bus; and a network adapter card coupled to said bus wherein said network adapter card comprises:
      a plurality of queued transmit entry point circuits, each for queuing data packets of a respective transmission priority and each comprising:
         a transmit entry point register; and
         a plurality of memory cells configured as a first-in-first-out (FIFO) memory circuit, said transmit entry point register for receiving, from said processor, new data packet pointers to data packets of said respective transmission priority and also for queuing said new data packet pointers into said FIFO memory circuit, said transmit entry point register also for maintaining the oldest queued data packet pointer of said FIFO memory circuit;
      a transmit FIFO memory circuit for storing digital data to be transmitted onto a network; and
      control circuit for accessing digital data from a memory space of said memory unit of said computer system and for supplying said digital data to said transmit FIFO memory circuit, said memory space being identified by an oldest queued data packet pointer as maintained by a selected one of said plurality of queued transmit entry point circuits.

8. A computer system as described in claim 7 wherein said network adapter card further comprises an N stage scaleable priority arbiter circuit for selecting said selected one of said plurality of queued transmit entry point circuits wherein at least N transmission priorities exist.

9. A computer system as described in claim 7 wherein, for a respective queued transmit entry point circuit, its transmit entry point register is the only memory cell, of said respective queued transmit entry point circuit, that is visible to said processor.

10. A computer system as described in claim 7 wherein, for a respective queued transmit entry point circuit, its queued transmit entry point circuit supplies its control circuit with a next-in-order data packet pointer upon completion of each data packet transmitted of its corresponding transmission priority.

11. A computer system as described in claim 7 wherein each respective queued transmit entry point circuit further comprises an overflow circuit for generating a FIFO full signal for said processor when said respective queued transmit entry point circuit is full.

12. A computer system as described in claim 7 wherein said network interface card further comprises:
   a receive FIFO memory circuit for receiving digital data from said network; and
   a queued receive entry point circuit comprising a receive entry point register and a plurality of memory cells configured as a FIFO memory circuit, said receive entry point register for receiving new memory space pointers and for queuing said new memory space pointers into said FIFO memory circuit of said queued receive entry point circuit, said receive entry point register for maintaining the oldest queued memory space pointer of said queued receive entry point circuit; and
   wherein said control circuit is also for storing digital data from said receive FIFO memory circuit to said memory unit of said computer system at a memory space indicated by said memory space pointer maintained by said FIFO receive entry point register.

13. A computer system as described in claim 7 wherein said bus is compliant with the Peripheral Components Interconnect (PCI) bus standard.

14. A computer system as described in claim 7 wherein said network is substantially compliant with the Ethernet communication standard.

15. A computer system as described in claim 7 wherein said network is substantially compliant with the IEEE 1394 communication standard.

16. A computer system as described in claim 7 wherein said network is substantially compliant with the Home PhoneLine standard.

17. A computer system as described in claim 7 wherein said network is substantially compliant with the HomeRF standard.

18. A computer system as described in claim 7 wherein said network is substantially compliant with the Home PowerLine standard.

* * * * *